H. B. WALLACE.
PROCESS OF MAKING TIRES.
APPLICATION FILED APR. 12, 1917.

1,258,506.

Patented Mar. 5, 1918.
4 SHEETS—SHEET 1.

Inventor:
Harry B. Wallace,
By Hugh K. Wagner
His Attorney.

H. B. WALLACE.
PROCESS OF MAKING TIRES.
APPLICATION FILED APR. 12, 1917.

1,258,506.

Patented Mar. 5, 1918.
4 SHEETS—SHEET 2.

Inventor:
Harry B. Wallace,
By Hugh K. Wagner
His Attorney.

H. B. WALLACE.
PROCESS OF MAKING TIRES.
APPLICATION FILED APR. 12, 1917.

1,258,506.

Patented Mar. 5, 1918.
4 SHEETS—SHEET 3.

Inventor:
Harry B. Wallace,
Hugh K. Wagner
His Attorney.

H. B. WALLACE.
PROCESS OF MAKING TIRES.
APPLICATION FILED APR. 12, 1917.
1,258,506.
Patented Mar. 5, 1918.
4 SHEETS—SHEET 4.
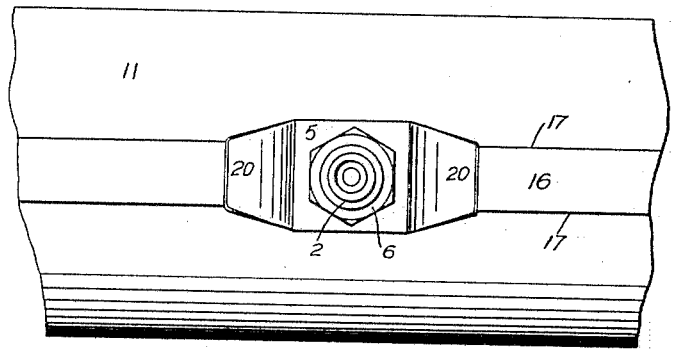
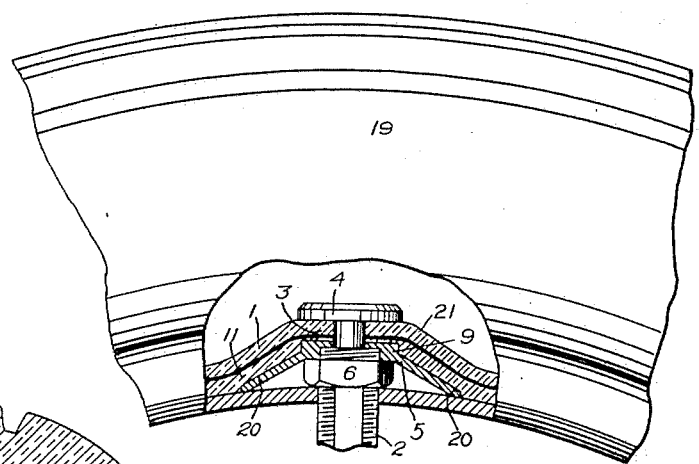
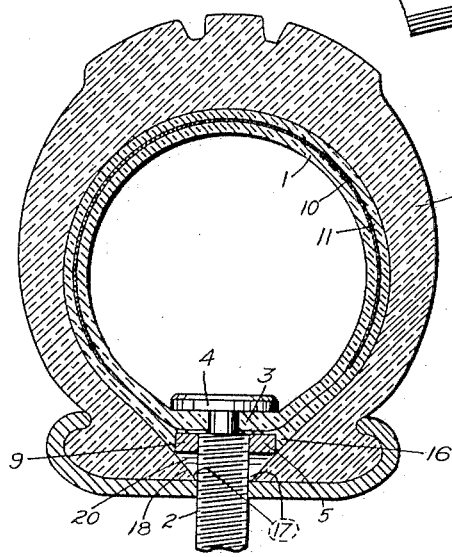
Inventor:
Harry B. Wallace,
By Hugh K. Wagner
His Attorney.

UNITED STATES PATENT OFFICE.

HARRY B. WALLACE, OF ST. LOUIS, MISSOURI.

PROCESS OF MAKING TIRES.

1,258,506.     Specification of Letters Patent.     Patented Mar. 5, 1918.

Application filed April 12, 1917. Serial No. 161,391.

*To all whom it may concern:*

Be it known that I, HARRY B. WALLACE, a citizen of the United States, residing at the city of St. Louis, in the State of Missouri, have invented certain new and useful Improvements in Processes of Making Tires, of which the following is a specification.

This is a continuation in part of an application filed by me January 22, 1917, serially numbered 143,557.

This invention relates to tires, especially of the kind that are used on automobiles, and to the method of making the same. These tires may be made either as air-tight casings adapted to be used minus the inner air tube now customarily in use or in the form of pneumatic inner tubes adapted to be inclosed in the outer casings now customary or the like. *Mutatis mutandis*, the method of this invention may be used for making any article of similar general construction.

The objects of this invention are, among others, to make inner tubes stronger and to that extent puncture proof; so to construct the same as to eliminate "blow-outs" and to obviate "pinches" of inner tubes; to eliminate the transverse seam customarily found in inner tubes; to make a tire or tube that is seamless in every direction; to make a tube which because of conforming in shape to the interior contour of the outer casing is more durable and requires less air-pressure for inflation; to facilitate, and therefore cheapen, the process of manufacture; to produce a tube that will cheapen the tire cost per mile, as it will greatly increase the mileage of any casing; and to produce other advantages that arise from the method of manufacture and inhering in the construction or constructions hereinafter described.

Heretofore inner tubes for tires have been formed in longitudinal tubular form on long metal calender rolls or mandrels and later bent into annular form and their ends joined in a transverse seam vulcanized by heat. The said transverse seam has been a point of weakness and a place where leaks resulting in flat tires have often occurred. A straight tube that is subsequently bent into annular shape naturally tends to break and crack on the inside of the curve because it has too much material there for its curvature and tends likewise to break and separate on its outer circumference because it has relatively too little material there. When such tubes are placed in a tire or casing for use they are much smaller than the cavity and not annular in shape. They are made to conform to the internal transverse sectional contour of the casing or tire-shoe by internal air-pressure, which stretches the rubber of the inner tube and retains it in this unevenly stretched position, thereby greatly weakening it.

The product of this invention is a tire or tube entirely seamless in every direction. The shape of the mold will impart to it any desired exterior form or pattern of construction, but when intended to be used as an inner tube the same will, by the shape of the said mold, be given a form substantially the same in contour as, and rather closely fitting the size of, the outer casing in which the same is to be used. As a result, there is no weakening of the inner tube due to stretching.

In the accompanying drawings forming part of this specification and in which like numbers of reference denote like parts wherever they occur, Figure 1 is a transverse sectional view of an ordinary inner tube such as now customarily in use;

Fig. 8 is a bottom plan view of the tube or tire illustrated in Fig. 3;

Fig. 9 is a sectional view of the valve keeper-plate and adjacent parts; and

Fig. 10 is a sectional view like Fig. 4, but cut at such point as to bisect the said keeper-plate.

Figure 1:
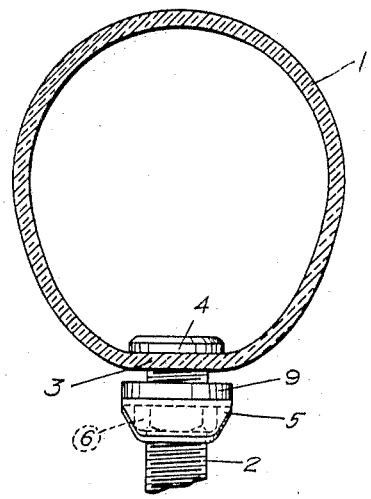

A partially cured ordinary inner tube 1, having a suitable valve 2 inserted in the usual way passing through a slightly thickened part 3 of the said tube and retained in place by the head 4, keeper-plate 5, and nut 6, is mounted on the work-holding rim 7, supported in any suitable manner on the standard 8 or the like, the said rim 7 having therein a hole (not shown in the drawings) through which the valve 2 passes.

Before mounting the said tube on the said work-holder, the keeper-plate 5 is passed along valve 2 (there being a hole in the said keeper-plate), and the nut 6 is screwed along the threads of valve 2 until the collar 9 on the keeper-plate 5 is pressed into the plastic rubber, thus making a tight joint. Then the said tube 1 is inflated, but with only a relatively light pressure, to give it the desired size and to constitute it a suitable working or building surface while the tube or tire herein described is being built on the said tube. This air-pressure is retained therein by any suitable closure (not shown in the drawings).

The said tube 1 being only partially cured, its outer surface is more or less sticky, but as desirable or necessary may or may not be coated with a suitable rubber cement for the purpose of securing the best fusion or union with the material yet to be applied. When ply 10 of protective textile fabric or the like or ply 11 of uncured plastic rubber is laid thereon, adhesion between the two takes place. The layer of protective material 10 may be textile fabric frictioned with a suitable compound of rubber and coated on one side with the same, and may be laid and worked on the tube 1 in annular form over the periphery and down the sides as far as desirable. Then a ply or layer 11 of plastic compounded rubber is worked thereon, which may or may not inclose the entire tube.

Figure 3:
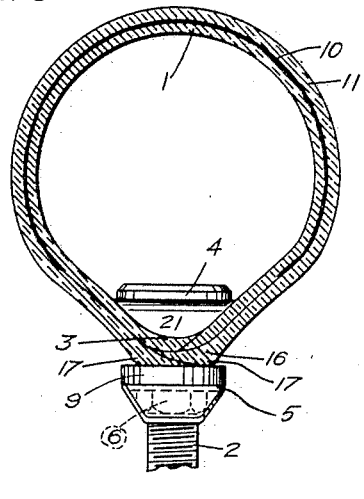
Fig. 3 is a transverse sectional view of a tire or tube constructed according to this invention.
Figure 4:
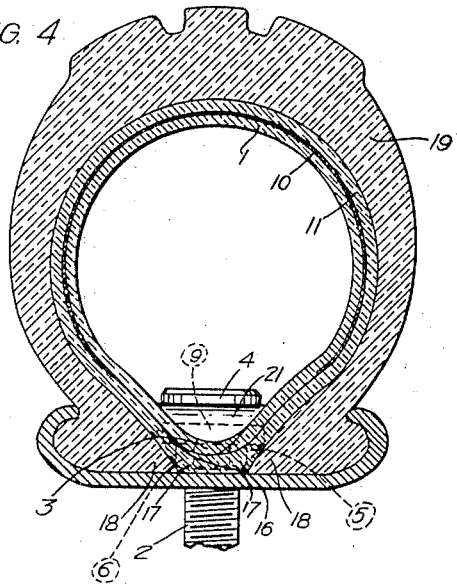
Fig. 4 is a transverse sectional view illustrating the same used as an inner tube within an ordinary outer casing and on a felly or rim of the ordinary clencher type.
Figure 5:
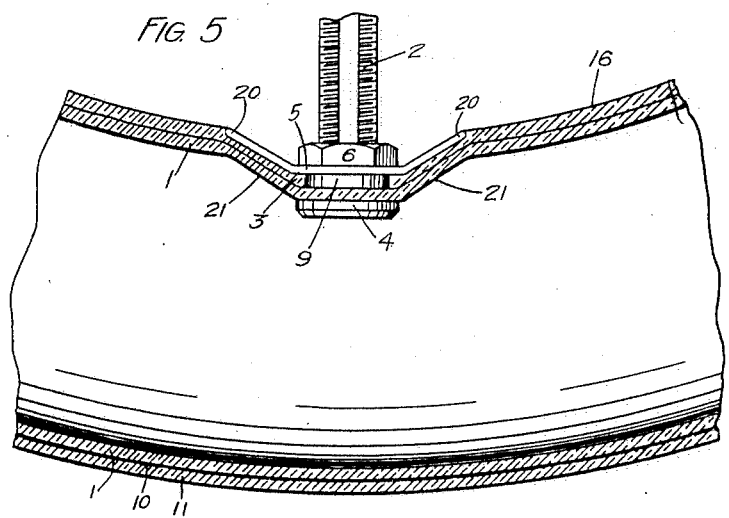
Fig. 5 is a longitudinal sectional view of the tire or tube illustrated in Fig. 3.
Figure 6:
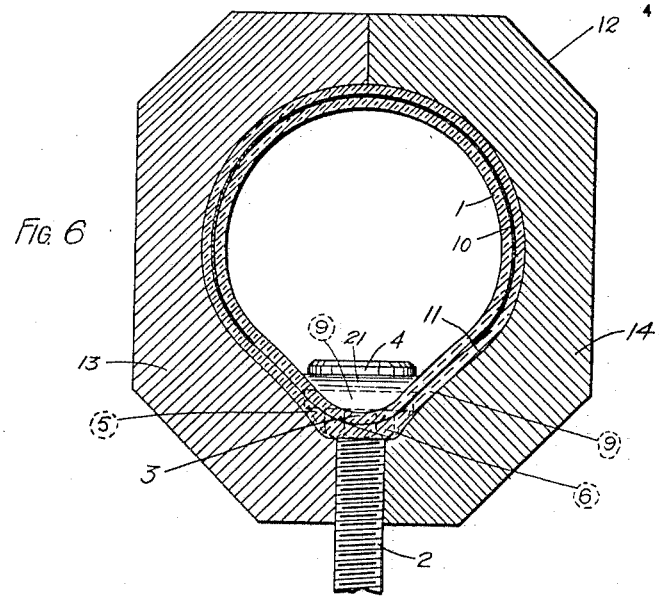
Fig. 6 shows a tire or tube such as shown in Figs. 3 and 5 in the mold in which it is shaped and cured.

The tube or tire illustrated in Figs. 3 and 5, and shown in Figs. 4 and 10 as used in the way of an inner tube within an ordinary tire shoe or casing, and shown within a curing or vulcanizing mold in Fig. 6, is built up of any desired number of plies of plastic rubber, alternated, if desired, with a ply or plies of protective and resilient textile fabric or the like.

Figure 2:
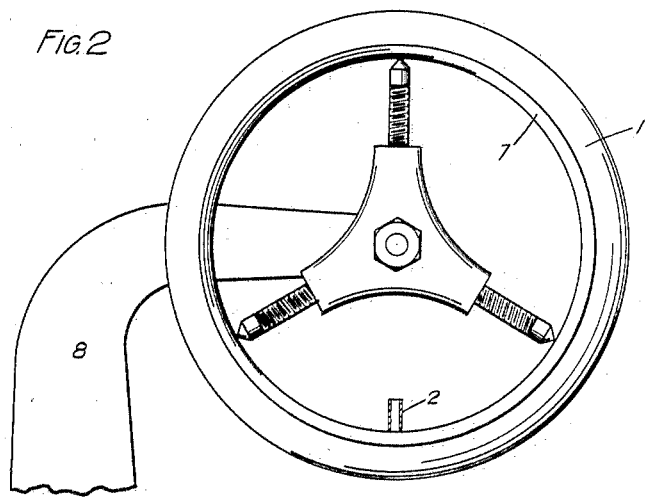
Fig. 2 is an elevation of the work-holding arm of an ordinary tire-builder, the said arm and connected parts holding in workable position the ordinary inner tube of Fig. 1.

With reference to the article shown in the drawings, the process of building the same is as follows: Upon the tube 1, while held by the work-holder shown in Fig. 2, is laid fabric ply 10, which is caused to adhere thereto. Thereupon plastic rubber ply 11 is laid upon and caused to adhere to the said ply 10 and to any part of tube 1 not covered by ply 10. It will be noted that the meeting edges of ply 11 may or may not overlap each other.

In building the tube or tire as just described, each ply of rubber or fabric is worked upon the member underlying the same by suitable hand or other tools, such as rollers, knives, mallets, pestles, or the like. In that way, air-bubbles and loose places are eliminated and close adhesion between the several parts is secured. These remarks apply, also, to the overlapping edges mentioned above.

The completed tire or tube is then placed in the two-piece mold 12 formed of two counterpart pieces 13 and 14 having the valve hole 15 therein, through which the valve 2 protrudes, and a sufficient amount of air or other fluid is introduced through the said valve, and the valve closed. The mold with its contents is then put in a vulcanizing or baking oven, where a suitable temperature is applied whereby the vulcanization of the tire or tube is completed.

In this step of vulcanization, the partially cured inner tube fuses with its next adjoining ply or plies, and all the plies of the article fuse together in an integral mass or integral whole, and the tire or tube is thereby rendered seamless in every direction, and formed into the desired shape and size, which in the instance of an inner tube will be the shape and size of the casing in which it is to be used.

Due to the fact that the partially cured inner tube 1 on which the rest of the tire or tube of this invention is built up is itself air-tight at the beginning of the process of manufacture, and due to the fact that as the same at the beginning is only partially cured and, therefore, readily softens when vulcanization of the entire article takes place and consequently amalgamates therewith in an integral manner, it is evident that the tire or tube produced as hereinabove described is air-tight in an unusual degree and, because of its construction, unusually free from flaws or defects that would tend to shorten its life or usefulness.

Built up, as it is, of a plurality of plies or thicknesses of material, it has unusual strength and durability when used as an inner tube, the thickness of its wall being, generally stated, about three times the thickness of the wall of an ordinary inner tube.

Some air is required for its inflation, but the same is made approximately the same size and shape as the inside cavity of the shoe or casing in which the same is to be used as an inner tube. Therefore, a relatively less amount of air-pressure than customarily used with ordinary inner tubes will completely inflate the same and serve as an easy-riding cushion. Some resiliency is needed in automobile tires, and this is best secured by the combination of rubber and air; but the greater the air-pressure, the less the resiliency. On account of the extra thickness of the inner tube constructed as herein described, it provides relatively more rubber conjoined with less air.

By means of the shape of the mold 12, a bead or rib 16, having preferably rounded corners 17, is formed, which bead extends throughout the entire interior circumference of the tire or tube. This bead 16 has the effect of entering as a wedge between the opposite lips 18 of the casing 19, and seats upon the felly or felly-rim of the wheel, and holds the lips more firmly in place. The article at the point where the bead or rib 16 is formed may be heavier or thicker than other parts of the wall of the tire or tube.

Not only does bead or rib 16 wedge between the opposite lips 18 of the casing 19, but the lugs 20 of the keeper-plate 5 (which, as shown in Fig. 8, are approximately the same width as bead 16) likewise wedge in between the lips 18 of the casing 19 and space the same apart, which wedging of the said lugs 20 and of the said bead 16 between the lips 18 prevents what are known as "pinches."

In a single-ply inner tube of the ordinary construction, the keeper-plate 5 and nut 6 are not countersunk as they are shown to be in the thicker construction herein described (see Figs. 5 and 9). This countersinking of keeper-plate 5 permits of the wedging of the lugs 20 between the lips 18, as hereinabove described. The said countersinking produces upon the inside of the tube or tire the bulge 21. The said countersinking is produced by the air-pressure within the tube or tire during vulcanization, which forces the tips of lugs 20 against the inside wall of mold 12 and presses the tire or tube material therearound in the shape shown in Figs. 5 and 9.

One of the main features and advantages of the method of making inner tubes herein described is that it permits and provides means for making an inner tube which as made and produced will possess a contour substantially conforming to the interior form or shape, as well as size, of the inside cavity of an ordinary outer casing within which the said tube is to be used, and, furthermore, that the said inner tube manufactured according to this method will be transversely and longitudinally seamless.

By the herein-described process of manufacturing tires, leaks are obviated, and thus no waste tires need to be discarded, and the product produced is superior in quality and serviceability and, therefore, nets a larger result to the manufacturer.

One of the reasons why tires (or tubes) as herein described are more durable than those otherwise constructed is that less pressure is necessary for adequate air inflation thereof. Another reason is that they are better cushioned on the tread of the felly or felly-rim of the wheel. Still another reason is that they are not stretched and weakened.

Inner tubes made in accordance with this invention to be used in outer casings can be shaped so as to fit exactly the interior contour of such an outer casing, instead of being made in the tubular form now practised on mandrels or calender rolls. They should be, also, of approximately the inner size of such casing, so as to require relatively little air-inflation to make them exactly fit the casing. When a tubular inner tube is placed inside a casing, it assumes the wedge shape of the interior contour of the casing only by reason of the air-pressure being so excessive as to force it out of its own tubular shape and so as to assume any shape possible to give it by expansion. The herein-described method of manufacture, however, allows the inner tube to be conformed in manufacture to the shape of the interior contour of a casing (which, as at present practised, is somewhat wedge shape), and the result is that when air-inflation takes place it is not necessary to introduce an enormous pressure adequate to force a tubular-shaped inner tube into the shape demarked by the outer casing, but the introduction of slight air-pressure causes the walls of the inner tube of this invention (shaped in manufacture to conform to the inner contour of the casing) to take the shape of the interior contour of the casing, and a very slight additional pressure will impart to the tire all the resiliency necessary. One of the greatest causes of deterioration in tubes and casings is the excessive pressure from within the same caused by air-inflation adequate to meet present conditions; but with the inner tubes of this invention, seventy-five per cent. (75%) of the air-pressure commonly applied in other makes is sufficient. For this reason, it has been found in actual practice that a casing of ordinary make having a weak spot or weak spots from cuts or other causes which would result in an immediate "blow-out" if inflated adequately with an ordinary inner tube can be used with an inner tube of the kind herein described, shaped to conform to the interior contour of the casing, and will give long augmented service.

It is well known that tires that are highly inflated with air are "hard-riding," while tires with air under inflated, i. e., having a less degree of air-pressure within the same, are "easy-riding." It is, therefore, another advantage of this invention that, while adequately inflated with seventy-five per cent. of the air-pressure properly necessary for ordinary tubes, the tires of this invention are "easy-riding," because of the less degree of air-pressure used in properly inflating the same. This is an advantage for any kind of car, but is a particular advantage in ambulances, pleasure cars, and the like. The more gently a car rides the less will be the vibration and consequent deterioration of all parts.

The wedge shape or shape somewhat like a section taken through the middle of a pear shown in Fig. 3 is imparted by the air or other fluid-pressure within the tube or tire while being cured and by the form of the mold.

Figure 7:
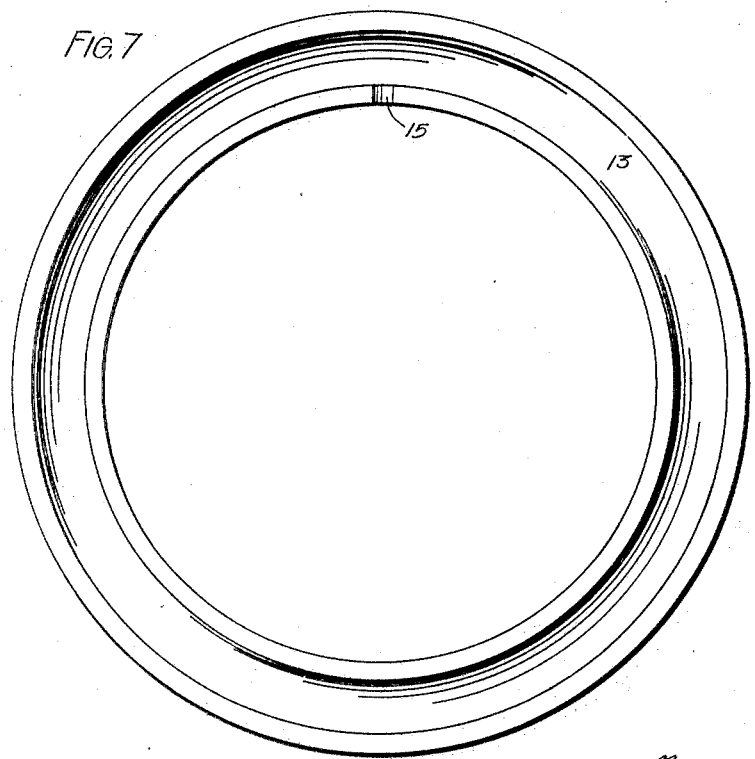
Fig. 7 is an inside view of one of the halves of the two-piece mold illustrated in Fig. 6.

Such is the merit inherent in an inner tube that conforms substantially to the shape and size of the interior contour of the tire shoe or casing within which the same is used that in case it is not desired to build up an inner tube as herein described of a plurality of plies, a partially cured inner tube of ordinary construction, such as depicted in Fig. 1, may, without superimposing a ply or plies of any kind of material thereon, be introduced into the mold 12 (shown in Figs. 6 and 7) and there be suitably inflated and thereupon its vulcanization completed in a shape and size to conform substantially to the interior contour of the casing within which the same is to be used.

I hereby reserve the benefit of all changes in form, arrangement, order, or use of parts, as it is evident that many minor changes may be made therein without departing from the spirit of this invention.

I claim:

1. The method of forming seamless airtight tubes or tires comprising superimposing upon an air-tight partially cured and partially inflated inner tube of ordinary construction and having a valve protruding therethrough a ply of protective material near the tread thereof and extending partially down its sides; superimposing thereon a ply of plastic rubber or the like and causing the edges thereof to meet; placing the same in a suitably shaped mold; and vulcanizing the whole into an integral mass by baking the same under suitable temperature.

2. The method of forming seamless airtight tubes or tires comprising superimposing upon an air-tight partially cured and partially inflated inner tube of ordinary construction and having a valve protruding therethrough a ply of protective material near the tread thereof and extending partially down its sides; superimposing thereon a ply of plastic rubber or the like and causing the edges thereof to overlap; placing the same in a suitably shaped mold; and vulcanizing the whole into an integral mass by baking the same under suitable temperature.

3. The method of forming a seamless airtight tube composed of plies of rubber plastic before vulcanization, which consists in superimposing said plies one upon the other, forming a bead or rib on the rim side of the tube of the longitudinal edges of one of said plies, whereby said rib forms an integral part thereof, and protruding a valve through said bead, the said bead imparting to said tube when used as an inner tube a shape approximately that of the cavity between the rim and the interior contour of an outer casing and vulcanizing the whole into an integral united structure under suitable temperature in a mold of suitable size and shape.

4. The method of forming a seamless airtight tube composed of plies of rubber plastic before vulcanization, which consists in superimposing said plies one upon the other, forming a bead or rib on the rim side of the tube of the longitudinal edges of one of said plies and part of the innermost ply, whereby said rib forms an integral part thereof, and protruding a valve through said bead, the said bead imparting to said tube when used as an inner tube a shape approximately that of the cavity between the rim and the interior contour of an outer casing and vulcanizing the whole into an integral united structure under suitable temperature in a mold of suitable size and shape.

5. The method of forming a seamless airtight tube which consists in partially inflating a partially-cured inner tube of ordinary construction having a fluid-admitting and retaining valve, laying on said partially-distended tube and working thereupon alternated plies of protective fabric and plastic rubber, each of which is caused to adhere to the one underlying the same, placing the structure in a mold having an interior size and contour substantially the duplicate of the interior size and contour of the shoe in which the tube is intended to be used, whereby the distended structure will assume a size and shape conforming substantially to the size and shape of the cavity between the rim and the interior contour of the shoe or casing, and vulcanizing the said distended structure in said mold.

6. The method of forming a seamless airtight tube which consists in partially inflating a partially-cured inner tube of ordinary construction having a fluid-admitting and retaining valve, laying on said partially-distended tube and working thereupon alternate plies of protective fabric and plastic rubber, each of which is caused to adhere to the one underlying the same, forming a bead from the longitudinal edges of said plies on the wheel-rim face of said tube, placing the structure in a mold having an interior size and contour substantially the duplicate of the interior size and contour of the shoe in which the tube is intended to be used, whereby the distended structure will assume a size and shape in the mold conforming substantially to the size and shape of the cavity between the rim and the interior contour of the shoe or casing, and vulcanizing said distended structure in said mold.

7. The method of forming a seamless airtight tube or tire which consists in forming a bead with a countersink therein on the wheel-rim side of the tube or tire, protruding a valve through the said countersink, placing a valve keeper-plate having lugs within said countersink with the lugs extending to a point flush with the top of said bead, and then vulcanizing the tire or tube.

8. The method of forming a seamless airtight tube or tire which consists in forming a bead with a countersink therein on the wheel-rim side of said tube or tire, protruding a valve through said countersink, placing a valve keeper-plate having lugs the width of the tips of each of which is substantially of the same width as said bead, and terminating said lugs flush with the top of said bead, and then vulcanizing the tire or tube.

9. The method of forming a seamless airtight tube which consists in partially inflating a partially-cured inner tube of ordinary construction having a fluid-admitting and retaining valve, laying on said partially distended tube and working thereupon alternate plies of protective fabric and plastic rubber, each of which is caused to adhere to the one underlying the same, forming a bead from the longitudinal edges of one or more of said plies on the wheel-rim side of said tube, forming a countersink in said bead around said valve, placing a valve keeper-plate having lugs within said countersink with the lugs extending to a point substantially flush with the top of said bead, placing the structure in a mold, and vulcanizing the same.

10. The method of forming a seamless airtight tube which consists in partially inflating a partially-cured inner tube of ordinary construction having a fluid-admitting and retaining valve, laying on said tube and working thereon alternate plies of protective fabric and plastic rubber each of which is caused to adhere to the one underlying the same, forming a bead from the longitudinal edges of said plies on the wheel rim face of the said tube, forming a countersink in said bead around said valve, placing a valve-keeper having lugs within said countersink with the lugs extending to a point substantially flush with the top of said bead, placing the structure thus built in a mold having an interior size and contour substantially the duplicate of the interior size and contour of the shoe or casing in which the tube is intended to be used, whereby the said structure will assume a size and shape in the mold substantially conforming to the size and shape of the cavity between the rim and the interior of the wall of the shoe or casing, and vulcanizing said distended structure in said mold.

11. The method of forming seamless airtight tubes or tires comprising the following steps: (1) Placing an annular partially vulcanized and partially inflated tir-tube having a valve in an annular support having a rim of the same circumferential dimensions as the inner periphery of the said tube, whereby the said tube is supported in shape during the next three steps of this process; (2) placing on the tread of the said tube a flat piece of protective material that extends partially down its sides; (3) placing a flat piece of plastic rubber on the tread over the said protective material and causing the longitudinal edges and ends thereof to meet; (4) kneading or working the same upon the said tube as a core and mold; and (5) vulcanizing the whole into an integral mass by baking the same at a suitable temperature while fluid inflated.

In testimony whereof I hereunto affix my signature.

HARRY B. WALLACE.